(12) United States Patent
Matsumoto

(10) Patent No.: US 11,245,846 B2
(45) Date of Patent: Feb. 8, 2022

(54) IMAGE CAPTURING CONTROL APPARATUS AND CONTROL METHOD THEREFOR

(71) Applicant: CANON KABUSHIKI KAISHA, Tokyo (JP)

(72) Inventor: Shogo Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/191,280

(22) Filed: Nov. 14, 2018

(65) Prior Publication Data
US 2019/0149730 A1    May 16, 2019

(30) Foreign Application Priority Data

Nov. 16, 2017    (JP) .............................. JP2017-221289

(51) Int. Cl.
| | | |
|---|---|---|
| *G03B 37/00* | (2021.01) | |
| *H04N 5/232* | (2006.01) | |
| *G06T 3/40* | (2006.01) | |

(52) U.S. Cl.
CPC ....... *H04N 5/23238* (2013.01); *G06T 3/4038* (2013.01); *H04N 5/23245* (2013.01); *H04N 5/23296* (2013.01); *H04N 5/232939* (2018.08); *H04N 5/232945* (2018.08)

(58) Field of Classification Search
CPC .. G06F 3/011; G06F 3/04845; G06F 16/4393; G06F 16/50; H04N 5/23238; H04N 5/23293; H04N 5/23216; H04N 5/23212; H04N 5/23296; H04N 5/2621; H04N 5/2258; G06T 5/50; G06T 2207/20221; G06T 2207/10148; G06T 3/4038; G06T 2200/32; G02B 2027/0138; G02B 2027/014; G02B 2027/0147; G02B 21/365; G02B 21/367; G03B 37/00
See application file for complete search history.

(56) References Cited

U.S. PATENT DOCUMENTS

| | | | | |
|---|---|---|---|---|
| 10,021,295 | B1* | 7/2018 | Baldwin | .......... H04N 5/232935 |
| 2004/0174444 | A1* | 9/2004 | Ishii | ................. H04N 5/232933 |
| | | | | 348/240.1 |
| 2013/0141524 | A1* | 6/2013 | Karunamuni | ...... H04N 5/23293 |
| | | | | 348/38 |

(Continued)

FOREIGN PATENT DOCUMENTS

| | | |
|---|---|---|
| CN | 101312501 A | 11/2008 |
| CN | 101547315 A | 9/2009 |

(Continued)

*Primary Examiner* — Alison Slater
(74) *Attorney, Agent, or Firm* — Canon U.S.A., Inc. IP Division

(57) ABSTRACT

An image capturing control apparatus including an acquisition unit configured to acquire information about a zoom magnification, a combining unit configured to combine a plurality of images acquired by a series of image capturing operations to generate a combined image wider in angle of view than each acquired image, and a control unit configured to perform control to display, before starting of the series of image capturing operations, an item indicating an angle of view of a combined image which is able to be generated by the combining unit, based on the acquired information.

17 Claims, 5 Drawing Sheets

(56) References Cited

U.S. PATENT DOCUMENTS

| | | | |
|---|---|---|---|
| 2013/0169746 A1* | 7/2013 | Iho | H04N 5/23238 348/37 |
| 2014/0071336 A1* | 3/2014 | Takanashi | H04N 5/23209 348/360 |
| 2014/0300688 A1* | 10/2014 | Shin | H04N 5/23238 348/36 |
| 2015/0124047 A1* | 5/2015 | Yatziv | H04N 5/23293 348/37 |
| 2015/0163526 A1* | 6/2015 | Matsumoto | G03B 37/00 348/36 |
| 2015/0312478 A1* | 10/2015 | Barcovschi | H04N 5/23238 348/36 |
| 2016/0037069 A1* | 2/2016 | Kim | H04N 5/23238 348/36 |
| 2017/0324898 A9* | 11/2017 | Karunamuni | G03B 37/02 |
| 2019/0289201 A1* | 9/2019 | Nishimura | H04N 5/232939 |

FOREIGN PATENT DOCUMENTS

| | | | | |
|---|---|---|---|---|
| CN | 101802705 A | * | 8/2010 | G03B 17/14 |
| CN | 103685790 A | | 3/2014 | |
| JP | 6-303562 A | | 10/1994 | |
| JP | 2005051454 A | | 2/2005 | |
| JP | 2005303594 A | | 10/2005 | |
| JP | 2015152723 A | | 8/2015 | |

* cited by examiner

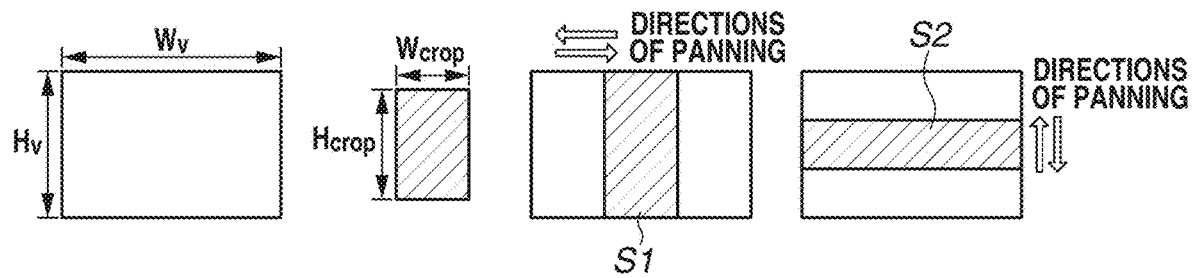
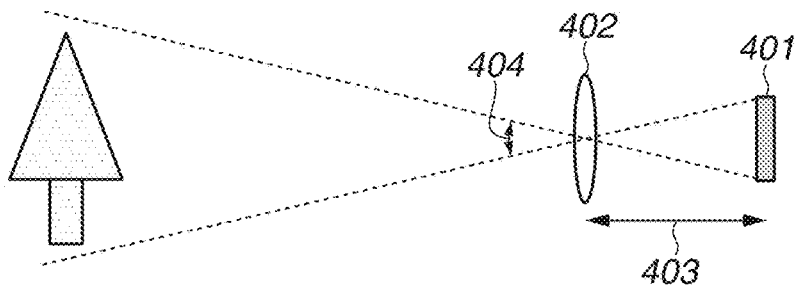
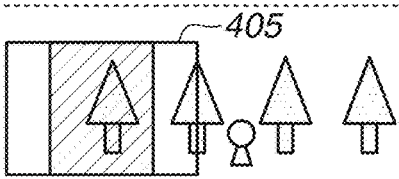
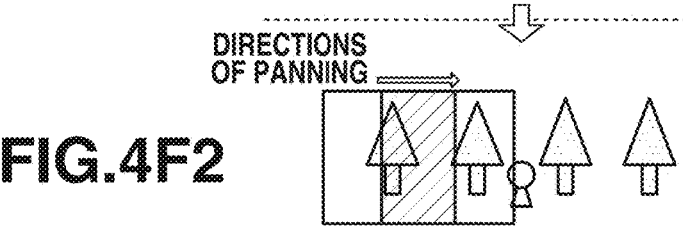
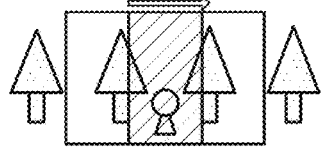
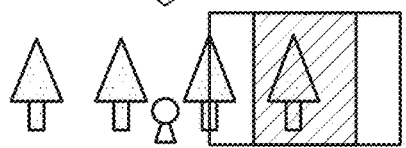
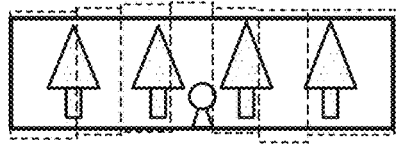

IMAGE CAPTURING CONTROL APPARATUS AND CONTROL METHOD THEREFOR

BACKGROUND

Field of the Disclosure

Aspects of the present disclosure generally relate to an image capturing control apparatus which is capable of performing a series of image capturing operations to combine a plurality of images and to a control method therefor.

Description of the Related Art

In panoramic image capturing, which performs a plurality of image capturing operations and combines captured images, there is a method of displaying a guide. Japanese Patent Application Laid-Open No. 6-303562 discusses a method of calculating a movement amount of an image having moved from the time when an image capturing operation for panoramic image capturing starts and a movement amount of an image required for generating a panoramic image and then displaying a state of progress of panoramic image capturing.

The method discussed in Japanese Patent Application Laid-Open No. 6-303562 does not enable recognizing the angle of view of a combined image to be obtained by combining images in panoramic image capturing, but only enables knowing, after completion of image capturing, what angle of view has been acquired in panoramic image capturing. Moreover, the method does not enable knowing, before performing panning, at what speed to move the camera.

SUMMARY

Aspects of the present disclosure are generally directed to solving at least one of the above-mentioned issues and providing an image capturing control apparatus which enables the user to perform panoramic image capturing in a more appropriate manner.

According to an aspect of the present disclosure, there is provided an image capturing control apparatus including an acquisition unit configured to acquire information about a zoom magnification, a combining unit configured to combine a plurality of images acquired by a series of image capturing operations to generate a combined image wider in angle of view than each acquired image, and a control unit configured to perform control to display, before starting of the series of image capturing operations, an item indicating an angle of view of a combined image which is able to be generated by the combining unit combining a plurality of images, based on the acquired information.

Further features of the present disclosure will become apparent from the following description of exemplary embodiments with reference to the attached drawings.

BRIEF DESCRIPTION OF THE DRAWINGS

FIGS. 4A, 4B, 4C, 4D, 4E, 4F1, 4F2, 4F3, 4F4, and 4F5 are diagrams which are used to explain panoramic image capturing.

DESCRIPTION OF THE EMBODIMENTS

Various exemplary embodiments, features, and aspects of the present disclosure will be described in detail below with reference to the drawings.

Figure 1A:
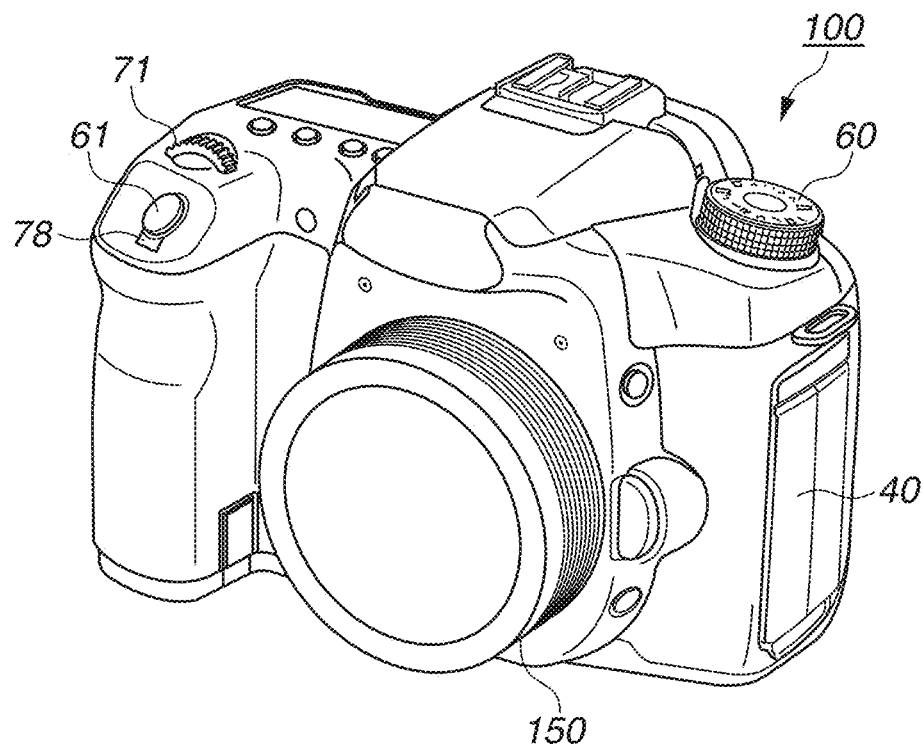
FIGS. 1A and 1B are appearance diagrams of a digital camera serving as an example of an apparatus to which a configuration of an exemplary embodiment of the present disclosure can be applied.
Figure 1B:
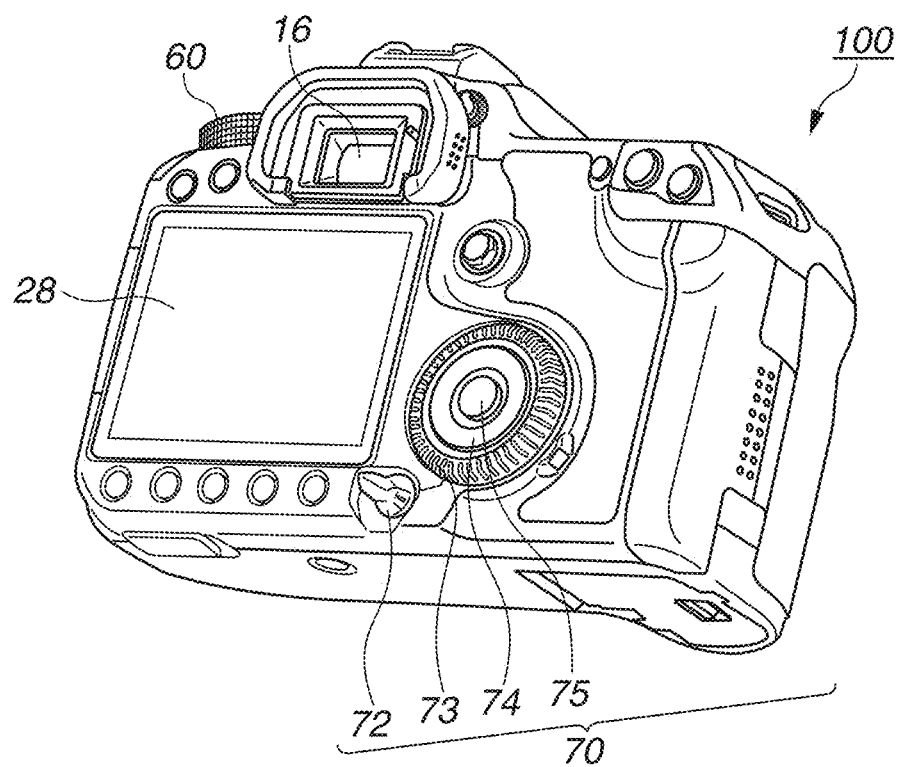

FIGS. 1A and 1B are appearance diagrams of a digital camera serving as an exemplary embodiment of an imaging apparatus to which the present disclosure can be applied. FIG. 1A is a front surface perspective view of the digital camera 100, and FIG. 1B is a back surface perspective view of the digital camera 100. In FIGS. 1A and 1B, a display unit 28 is a display unit which displays an image or various pieces of information. A shutter button 61 is an operation unit which is usable to issue an image capturing instruction. A mode selection switch 60 is an operation unit which is usable to switch between various modes. A terminal cover 40 is a cover which protects connectors (not illustrated) such as connection cables which connect connection cables of an external device and the digital camera 100. A main electronic dial 71 is a rotational operation member, so that the main electronic dial 71 can be rotated to perform, for example, changing of setting values such as the shutter speed and aperture value. A power switch 72 is an operation member which is usable to switch between turning-on and turning-off of the power source of the digital camera 100. A sub-electronic dial 73 is a rotational operation member which is usable to perform, for example, movement of a selection frame or image advance. Arrow keys 74 are four-way keys in which upper, lower, left, and right portions thereof are being able to be pressed. An operation corresponding to a pressed portion of the arrow keys 74 is able to be performed. A SET button 75 is a push button which is mainly used to, for example, determine a selection item. The shutter button 61 is a button used to issue an image capturing instruction, and is usable to issue an image capturing instruction for a still image and an image capturing instruction for a moving image. Moreover, the shutter button 61 can be pressed to start panoramic image capturing. In panoramic image capturing, when the shutter button 61 is pressed, a plurality of images is captured. Moreover, as described below, a plurality of captured images is combined to generate a horizontally long or vertically long image. The maximum width of an image obtained by combining images is predetermined, so that, when image capturing for a predetermined amount (pixel width) is completed, panoramic image capturing ends. Alternatively, when the user presses the shutter button 61 after panoramic image capturing is started, panoramic image capturing ends and a combined image is generated from a plurality of images captured until then. A zoom lever 78 is a lever located in such a way as to surround the shutter button 61, and can be rotated from side to side to move the position of the lens, thus enabling changing the optical zoom magnification. The shutter button 61, the main electronic dial 71, the power switch 72, the sub-electronic dial 73, the arrow keys 74, and the SET button 75 are included in an operation unit 70. An eyepiece viewfinder 16 is a looking-into type viewfinder which allows the user to observe a focusing screen (not illustrated) to check focusing or composition of an optical image of a subject obtained through a lens unit 150 (FIG. 2).

Figure 2:
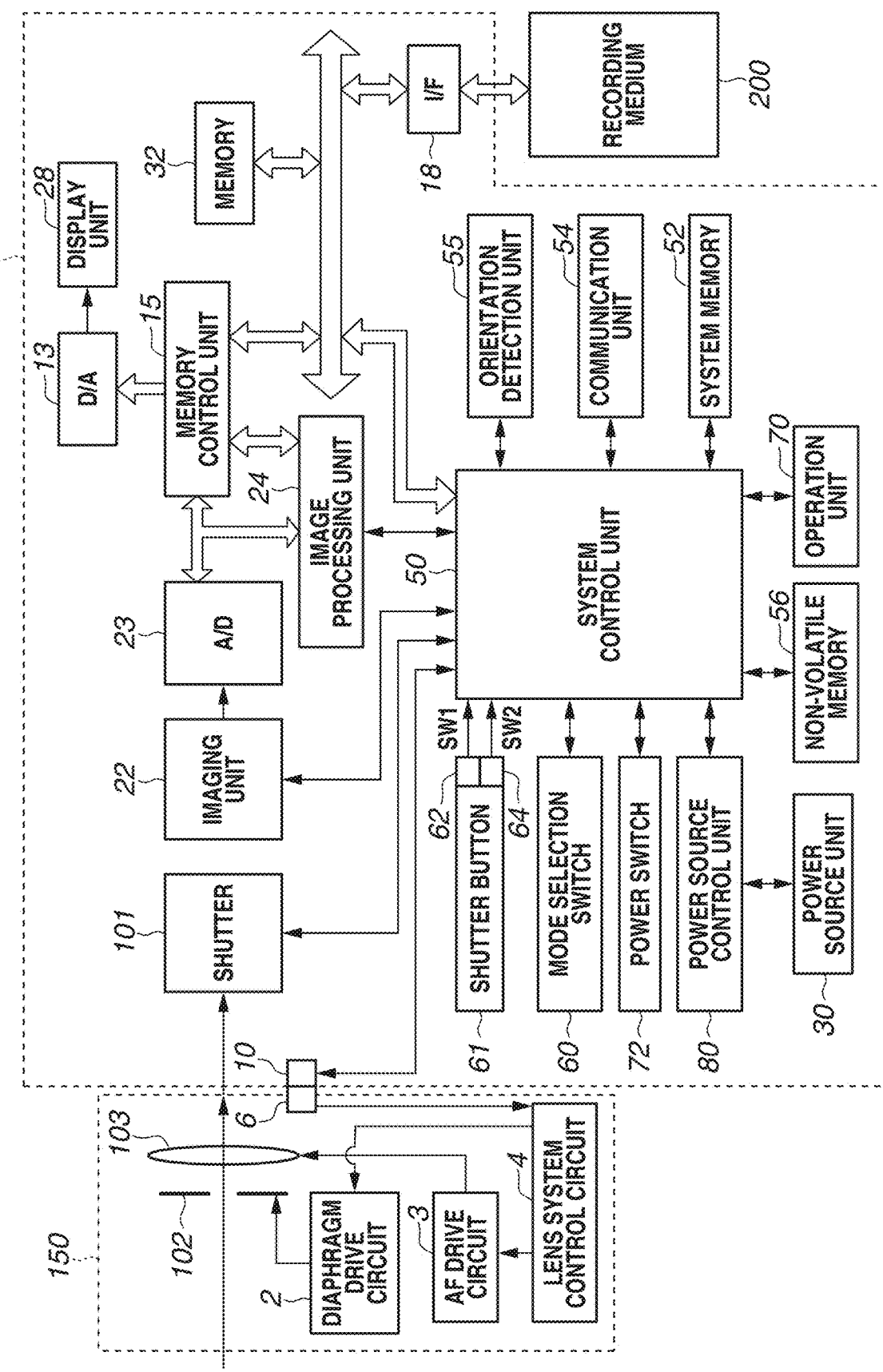
FIG. 2 is a block diagram illustrating a configuration example of the digital camera to which a configuration of the present exemplary embodiment can be applied.

FIG. 2 is a block diagram illustrating a configuration example of the digital camera 100 according to the present exemplary embodiment. In FIG. 2, the lens unit 150 is a lens unit in which an interchangeable image capturing lens is mounted.

A lens 103 is usually composed of a plurality of lens elements, but, in FIG. 2, is illustrated simply as a single lens element. A communication terminal 6 is a communication terminal used for the lens unit 150 to perform communication with the digital camera 100, and a communication terminal 10 is a communication terminal used for the digital camera 100 to perform communication with the lens unit 150. The lens unit 150 performs communication with a system control unit 50 via the communication terminals 6 and 10, and causes a lens system control circuit 4, which is included in the lens unit 150, to perform control of a diaphragm 102 via a diaphragm drive circuit 2 and vary the position of the lens 103 via an autofocus (AF) drive circuit 3, thus adjusting focus.

A shutter 101 is provided to control the exposure time of an imaging unit 22 under the control of the system control unit 50. The imaging unit 22 is an image sensor configured with, for example, a charge-coupled device (CCD) element or a complementary metal-oxide semiconductor (CMOS) element, which converts an optical image into an electrical signal.

An analog-to-digital (A/D) converter 23 converts an analog image signal output from the imaging unit 22 into digital data, and an image processing unit 24 performs predetermined pixel interpolation, resizing processing such as reduction, and color conversion processing on the data output from the A/D converter 23 or data read out from a memory control unit 15. Moreover, the image processing unit 24 performs predetermined calculation processing using the captured image data, and the system control unit 50 performs exposure control and distance measurement control based on the obtained calculation result. With this, autofocus (AF) processing of the through-the-lens (TTL) type, automatic exposure (AE) processing, and electronic flash (EF) (flash preliminary light emission) processing are performed. The image processing unit 24 further performs predetermined calculation processing using the captured image data, and performs automatic white balance (AWB) processing of the TTL type based on the obtained calculation result.

Data output from the A/D converter 23 is then written in a memory 32 via the image processing unit 24 and the memory control unit 15 or directly via the memory control unit 15 without via the image processing unit 24. The memory 32 stores image data acquired by the imaging unit 22 and converted into digital data by the A/D converter 23 or image data that is to be displayed on the display unit 28. The memory 32 has a storage capacity to store a predetermined number of still images or a moving image and sound taken for a predetermined time. Moreover, the memory 32 also serves as a memory for image display (video memory).

A digital-to-analog (D/A) converter 13 converts data for image display stored in the memory 32 into an analog signal and supplies the analog signal to the display unit 28. In this way, image data for display stored in the memory 32 is then displayed on the display unit 28 via the D/A converter 13. The display unit 28 performs display corresponding to the analog signal supplied from the D/A converter 13 on a display device, such as a liquid crystal display (LCD). A digital signal obtained by A/D conversion performed once by the A/D converter 23 and stored in the memory 32 is then converted into an analog signal by the D/A converter 13, and the analog signal is then sequentially transferred to the display unit 28 and displayed thereon, so that the function of an electronic viewfinder is implemented, thus enabling performing through-image display (live view display).

A non-volatile memory 56 is a memory serving as a recording medium on which erasing, recording, and reading operations can be electrically performed by the system control unit 50, and includes, for example, an electrically erasable programmable read-only memory (EEPROM). For example, constants and a program for operations of the system control unit 50 are stored in the non-volatile memory 56. The program as used here is a computer program which is executed to perform various flowcharts described below in the present exemplary embodiment.

The system control unit 50 contains therein at least one processor, and controls the entire digital camera 100. The system control unit 50 functions as a computer which implements various processing operations in the present exemplary embodiment by executing the program recorded on the non-volatile memory 56.

A system memory 52 includes a random access memory (RAM), on which, for example, constants and variables for operations of the system control unit 50 and a program read out from the non-volatile memory 56. Moreover, the system control unit 50 also performs display control by controlling, for example, the memory 32, the D/A converter 13, and the display unit 28.

The mode selection switch 60 switches an operation mode of the system control unit 50 to any one of, for example, a still image recording mode, a moving image capturing mode, and a playback mode. Modes included in the still image recording mode include an automatic image capturing mode, an automatic scene discrimination mode, a manual mode, a panoramic image capturing mode, various scene modes in which image capturing settings for the respective image capturing scenes are performed, a program automatic exposure (AE) mode, and a custom mode. The mode selection switch 60 is used to directly switch the operation mode of the system control unit 50 to any one of these modes included in a menu screen. Alternatively, after switching to the menu screen is once performed by the mode selection switch 60, another operation member can be used to perform switching to any one of these modes included in the menu screen. Likewise, a plurality of modes can be included in the moving image capturing mode.

A first shutter switch 62 is configured to be turned on in response to a halfway operation, in other words, a half-pressed state, of the shutter button 61 of the digital camera 100 (an image capturing preparation instruction), thus generating a first shutter switch signal SW1. In response to the first shutter switch signal SW1, operations, such as autofocus (AF) processing, automatic exposure (AE) processing, automatic white balance (AWB) processing, and flash preliminary emission (EF) processing, are started.

A second shutter switch 64 is configured to be turned on in response to a complete operation, in other words, a fully-pressed state, of the shutter button 61 (an image capturing instruction), thus generating a second shutter switch signal SW2. In response to the second shutter switch signal SW2, the system control unit 50 starts a series of image capturing processing operations starting with a still image capturing operation performed by the imaging unit 22 and a signal readout operation from the imaging unit 22 and leading to a writing operation for data to a recording medium 200.

Various operation members of the operation unit 70 are assigned the respective functions for each situation as appropriate with various function icons displayed on the display unit 28 being selected and operated, and thus act as various function buttons. The function buttons include, for example, an end button, a back button, an image forwarding button, a jump button, a stop-down button, and an attribute changing button. For example, when a menu button is pressed, various settable menu screens are displayed on the display unit 28. The user is allowed to intuitively perform various settings with use of a menu screen displayed on the display unit 28 and 4-way up, down, left, and right buttons and the SET button.

A power source control unit 80 is configured with, for example, a battery detection circuit, a DC-DC converter, and a switch circuit for switching blocks to be energized, and detects the presence or absence of attachment of a battery, the type of a battery, and the remaining amount of battery power. Moreover, the power source control unit 80 controls the DC-DC converter based on a result of such detection and an instruction from the system control unit 50, supplies voltages to various portions, including the recording medium 200, for respective periods. The power switch 72 is a switch used to switch power-on and power-off of the digital camera 100. The power source unit 30 includes, for example, a primary battery, such as an alkaline battery or a lithium battery, a secondary battery, such as a nickel-cadmium (NiCd) battery, a nickel-metal hydride (NiMH) battery, or a lithium (Li) battery, or an alternating current (AC) adapter.

A recording medium interface (I/F) 18 is an interface with the recording medium 200, such as a memory card or a hard disk. The recording medium 200 is a non-volatile recording medium, such as a memory card, which is used to record an image at the time of image capturing, and is configured with, for example, a semiconductor memory, an optical disc, or a magnetic disc.

A communication unit 54 connects to an external device or a network via wireless or via a wired cable, and performs transmission and reception of, for example, a video signal and an audio signal. The communication unit 54 is also able to connect to a wireless local area network (LAN) or the Internet. The communication unit 54 is able to transmit an image (including a through-image) captured by the imaging unit 22 and an image recorded on the recording medium 200, and is also able to receive image data or various other pieces of information from an external device.

An orientation detection unit 55 detects the orientation of the digital camera 100 with respect to the direction of gravitational force. Whether an image captured by the imaging unit 22 is an image captured with the digital camera 100 held in a landscape orientation or an image captured with the digital camera 100 held in a portrait orientation can be discriminated based on the orientation detected by the orientation detection unit 55. The system control unit 50 is able to append orientation information corresponding to the orientation detected by the orientation detection unit 55 to an image file of the image captured by the imaging unit 22 or to perform recording with an image rotated. The orientation detection unit 55 to be used includes, for example, an acceleration sensor and a gyroscope sensor.

Figure 3:
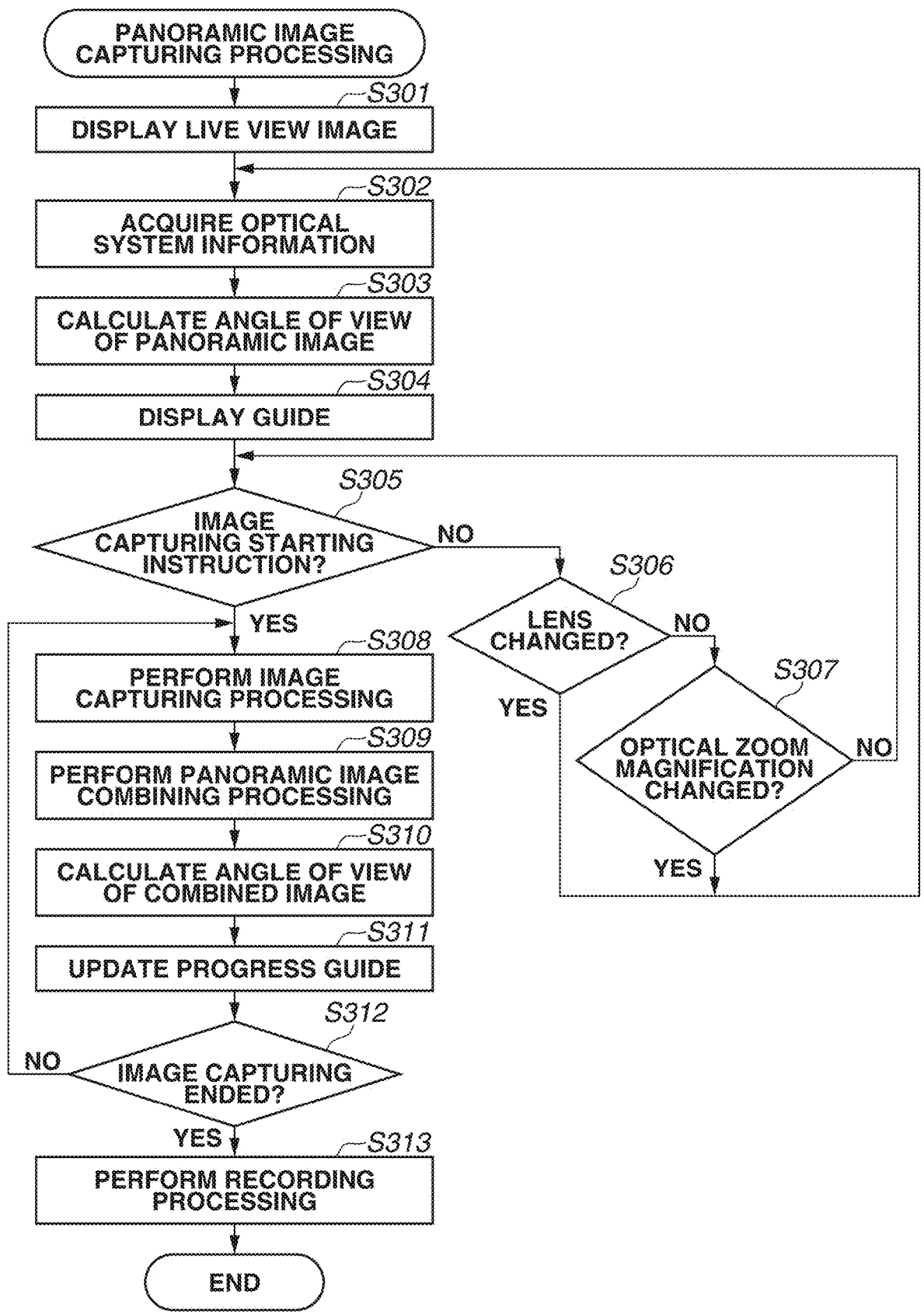
FIG. 3 is a flowchart of panoramic image capturing processing in the present exemplary embodiment.

Next, panoramic image capturing processing in the present exemplary embodiment is described with reference to FIG. 3. This processing is implemented by the system control unit 50 loading a program recorded on the non-volatile memory 56 onto the system memory 52 and executing the program. Furthermore, this processing is started in response to the digital camera 100 being powered on and being switched to a panoramic image capturing mode.

Figure 5A:
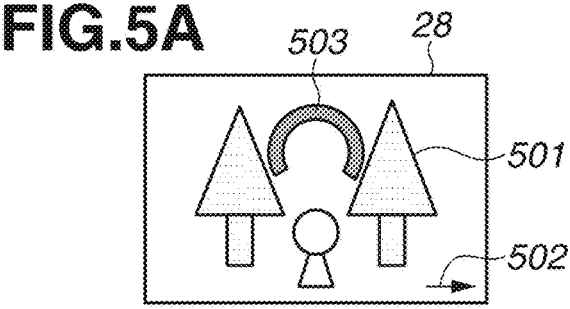
FIGS. 5A, 5B, 5C, 5D, 5E, 5F, 5G, 5H, 5I, and 5J are diagrams illustrating display examples in the present exemplary embodiment.

In step S301, the system control unit 50 displays a live view image acquired by the imaging unit 22 on the display unit 28. The live view image is displayed as illustrated in FIG. 5A. In panoramic image capturing, the user moves the digital camera 100 to the right or left or upward or downward (performs panning) to gradually change subjects for image capturing (image capturing angles), so that the captured images are combined to generate a combined image with a wide angle of view. A method of acquiring an image in panoramic image capturing is described with reference to FIGS. 4A, 4B, 4C, and 4D. FIGS. 4A to 4D are diagrams used to explain a relationship between the direction in which to pan the digital camera 100 and a cropping area to be cropped from image data. FIG. 4A illustrates an effective image region of an image sensor included in the imaging unit 22, in which "Wv" denotes the number of effective pixels in the horizontal direction and "Hv" denotes the number of effective pixels in the vertical direction. FIG. 4B illustrates a cropping area cropped from image data of the captured image, in which "Wcrop" denotes the number of cropping pixels in the horizontal direction and "Hcrop" denotes the number of cropping pixels in the vertical direction. FIG. 4C is a diagram illustrating a cropping area with respect to image data in a case where image capturing is performed while the digital camera 100 is panned in horizontal directions indicated by arrows. In FIG. 4C, an area S1 indicated by hatching represents a cropping area to be cropped from the image data, in which cropping of the image data in the horizontal direction is set to "Wv>Wcrop" and cropping of the image data in the vertical direction is set to "Hv=Hcrop". FIG. 4D is a diagram illustrating a cropping area with respect to image data in a case where image capturing is performed while the digital camera 100 is panned in vertical directions indicated by arrows. In FIG. 4D, an area S2 indicated by hatching represents a cropping area to be cropped from the image data, in which cropping of the image data in the horizontal direction is set to "Wv=Wcrop" and cropping of the image data in the vertical direction is set to "Hv>Hcrop". A cropping area of image data of a captured image can be set different for every piece of image data. Moreover, with respect to image data to be obtained at the time of start of panning and image data to be obtained at the time of end of panning, the respective cropping areas can be set wider so as to widen the angle of view. The method of determining a cropping area of image data can be set by, for example, a difference between the angle of the digital camera 100 obtained immediately after image capturing and the angle of the digital camera 100 obtained one frame before. Cropping and storing image data for combining processing for a panoramic image enables saving a storage capacity of the memory 32.

In this way, images to be combined are acquired while panning is being performed, and a plurality of images is sequentially combined in the horizontal direction or in the vertical direction in such a manner that the same subject becomes situated at the same position. With this, a range (angle of view) which is wider than a range that is able to be image-captured once in the image sensor can be acquired. In step S301, an item which indicates moving the digital camera 100 to the right, such as an item 502 illustrated in FIG. 5A, can be displayed.

In step S302, the system control unit 50 acquires optical system information. The optical system information to be acquired in step S302 is focal length information about the lens 103 relative to the imaging unit 22, which is acquired based on information about the lens 103 attached to the digital camera 100 and the value of a zoom magnification set thereto. Specifically, the system control unit 50 acquires image capturing information concerning the focal length loaded in the system memory 52.

In step S303, the system control unit 50 calculates the angle of view of a panoramic image. The system control unit 50 calculates, as angle-of-view information, the magnitude of the angle of view of a combined image recordable as one panoramic image, based on the focal length information included in the optical system information acquired in step S302. A specific calculation method is described with reference to FIG. 4E. FIG. 4E is a diagram schematically illustrating a relationship between the focal length of a lens relative to an image sensor and the angle of view. There are illustrated an image sensor 401, an image capturing lens 402, and a focal length 403 of the image capturing lens 402 relative to the image sensor 401. Then, there is also illustrated an angle of view 404 taken by the image sensor 401 and the image capturing lens 402. Moreover, in the present example, panoramic image capturing in the horizontal direction is described. Here, assuming that, with regard to the size of the image sensor 401, the width is denoted by Sw (mm), the angle of view 404 is denoted by θ (rad), and the focal length 403 is denoted by r (mm), the angle of view 404 can be calculated by the following formula (1).

$$\theta = 2 \times \arctan((Sw/2)/r) \quad (1)$$

The angle of view 404 indicated here is an angle of view relative to the entire surface of the image sensor 401 and, therefore, indicates the magnitude of the angle of view of one captured image used for combining.

On the other hand, the proportion of the angle of view of the entire surface of the image sensor 401 to the angle of view available for recording as a panoramic image is equivalent to the proportion of the width of one captured image used for combining to the maximum width of a recordable panoramic image. In other words, assuming that the maximum width of a recordable panoramic image (panoramic image maximum width) is denoted by Pw (pixels) and the width of one captured image (one-captured image width) is denoted by Iw (pixels), the magnitude of the angle of view available for recording as one panoramic image can be calculated as the angle of view Pθ by the following formula (2).

$$P\theta = (Pw/Iw) \times \theta \quad (2)$$

The following formula (3) is obtained based on formula (1) and formula (2).

$$P\theta = 2 \times (Pw/Iw) \times \arctan((Sw/2)/r) \quad (3)$$

In other words, in a case where the panoramic image maximum width Pw, the one-captured image width Iw, and the image sensor width Sw are assumed to be uniquely determined according to the digital camera 100, the magnitude Pθ of the angle of view available for recording as one panoramic image depends on the focal length r.

The details thereof are further described based on a specific numerical example. Suppose that the image sensor of the imaging unit 22 of the digital camera 100 is a CMOS sensor of the APS-C size, the horizontal width of the effective pixel portion thereof is 22.7 mm, and the focal length of the lens 103 relative to the imaging unit 22 is set to 18 mm by the zoom lever 78. Then, assuming that one captured image used for combining is composed of 5,000 pixels and the maximum width of a recordable panoramic image is 20,000 pixels, the magnitude of the angle of view available for recording as one panoramic image is calculated by formula (3) as an angle of view of about 258°. Likewise, in a case where the focal length is 36 mm, the magnitude of the angle of view available for recording as one panoramic image is calculated as an angle of view of about 140°.

These calculation processing operations are performed by the system control unit 50 and the image processing unit 24. Moreover, pieces of fixed data, such as the panoramic image maximum width, the one-captured image width, and the image sensor width, which are previously recorded on, for example, the system memory 52 or the recording medium 200, are loaded by the memory control unit 15 and are processed by the image processing unit 24. Information about the focal length, which is updated and recorded on the memory 32 each time the zoom lever 78 is operated, is also loaded by the memory control unit 15 and is processed by the image processing unit 24 during calculation processing. The calculated angle-of-view information is then recorded on the memory 32 via the memory control unit 15. While, in the above-mentioned example, panoramic image capturing in the horizontal direction has been described, the present exemplary embodiment can also be applied to panoramic image capturing in the vertical direction. In panoramic image capturing in the vertical direction, the panoramic image maximum width, the one-captured image width, and the image sensor width are changed to respective pieces of information about the height, and similar calculation processing operations can be performed to obtain the angle of view indicating the magnitude of the angle of view available for recording as one panoramic image.

Figure 5B:
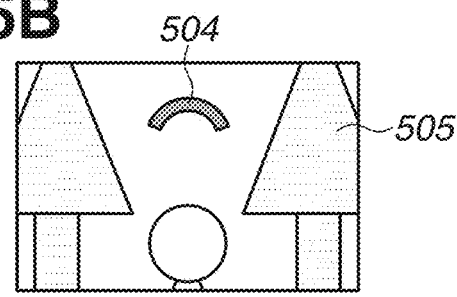

In step S304, the system control unit 50 displays an item indicating the range of angle of view available for image capturing in panoramic image capturing on the display unit 28. The item to be displayed in step S304 includes, for example, an item 503 or 504 illustrated in FIG. 5A or 5B. FIGS. 5A and 5B illustrate live view images obtained in a case where image capturing has been performed on the same subject, and, for example, the focal length in a case where the live view image 501 illustrated in FIG. 5A has been captured is assumed to be 18 mm and the focal length in a case where the live view image 505 illustrated in FIG. 5B has been captured is assumed to be 36 mm. In the example described in step S303, the magnitude of the angle of view available for recording as one panoramic image is 258° in a case where the focal length is 18 mm, and the magnitude of the angle of view available for recording as one panoramic image is 140° in a case where the focal length is 36 mm. The item 503 illustrated in FIG. 5A indicates that the angle of view of up to 258° is available for recording as one panoramic image, so that the item 503 enables the user to understand that a wide angle of view of 180° or more can be acquired as a combined image. The item 504 illustrated in FIG. 5B indicates that the angle of view of up to 140° C. is available for recording as one panoramic image, so that the item 504 enables the user to understand that an angle of view of less than 180° can be acquired as a combined image. In this way, displaying an item indicating the angle of view acquired in step S303 enables the user to understand the following. Specifically, in a case where the maximum width of a recordable panoramic image is fixed (for example, 20,000 pixels in the above-mentioned example), the user can understand, before image capturing, an image having what angle of view is able to be acquired in the current condition (for example, the focal length and the image sensor) of the digital camera 100. Since the user is able to understand, before performing panoramic image capturing, how large an angle of view out of the range of 360° encompassing the user can be attained, the user is enabled to perform image capturing while imagining an image to be obtained by combining. For example, even if the user would like to perform panoramic image capturing including the middle of a long bridge, in a case where image capturing is performed with use of a telephoto lens, when image capturing is started with one end of the bridge, the middle may become unable to be contained in a combined image. However, since preliminarily indicating the angle of view of an image to be obtained by combining enables understanding an angle of view that is able to be acquired, it becomes easy to understand from where starting panoramic image capturing enables an intended subject to be contained in a combined image. Alternatively, as illustrated in FIG. 5B, in a case where image capturing is performed at telephoto setting, the item 504 enables understanding that the maximum angle of view able to be obtained (the range of field of view available for recording as one panoramic image) is less than 180 degrees. Accordingly, in a case where the user intends to cause the range from one end of the bridge to the middle thereof to be contained in a combined image, the user can change the settings to the wide-angle side in advance, thus enabling obtaining a combined image with a wider angle of view. Furthermore, the angle of view of a captured image range that is currently being displayed as a live view image can be displayed together with the item 503 or 504.

In step S305, the system control unit 50 determines whether an image capturing starting instruction has been issued. The image capturing starting instruction can be issued in response to pressing of the shutter button 61. If it is determined that the image capturing starting instruction has been issued (YES in step S305), the processing proceeds to step S308, and, if not (NO in step S305), the processing proceeds to step S306.

In step S306, the system control unit 50 determines whether the lens unit 150 has been replaced and the lens 103 mounted therein has been changed. If it is determined that the lens 103 has been changed (YES in step S306), the processing returns to step S302, and, if not (NO in step S306), the processing proceeds to step S307.

In step S307, the system control unit 50 determines whether the optical zoom magnification has been changed (whether the lens position has been changed). The optical zoom magnification is changed according to an operation performed on the zoom lever 78. If it is determined that the optical zoom magnification has been changed (YES in step S307), the processing returns to step S302, and, if not (NO in step S307), the processing returns to step S305. In a case where the optical zoom magnification or the lens 103 has been changed, since the range of angle of view to be calculated in step S303 changes, the processing returns to step S302, so that the system control unit 50 re-performs processing for calculating the angle of view.

In step S308, the system control unit 50 performs image capturing processing. In the image capturing processing, the imaging unit 22 controls the shutter and the diaphragm and then acquires a still image.

In step S309, the system control unit 50 performs panoramic image combining processing. Processing in step S308 and step S309 is described with reference to FIGS. 4F1, 4F2, 4F3, 4F4, and 4F5. FIG. 4F1 to FIG. 4F5 are diagrams used to explain the flow of combining processing for a panoramic image. In FIG. 4F1, dot-hatched areas are areas schematically representing a line of trees included in the field of view, and a diagonal-hatched area represents a cropping area in image data. FIG. 4F1 illustrates the position of an image first captured at the time of pressing of the shutter button 61, in which a range 405 indicates an image capturing range acquired by image capturing performed one time (image capturing processing in step S308), so that the field of view is set to one end of a panoramic image intended to be obtained by combining. FIG. 4F2 and FIG. 4F3 schematically illustrate a state in which image capturing is sequentially performed while the digital camera 100 is being panned toward the other end of the panoramic image intended to be obtained by combining. In panoramic image capturing, image capturing is sequentially performed on an image by image basis as illustrated in FIG. 4F2 and FIG. 4F3, and combining processing is performed in step S309 each time and processing in step S310 to step S312 described below is also performed. Moreover, processing in step S308 to step S312 is performed until image capturing is ended in step S312 when it is determined that the width (number of pixels) of an image which is obtained by combining the acquired pieces of image data has reached the maximum (for example, 20,000 pixels). Here, the user does not issue an image capturing instruction in each image capturing operation, but an image capturing starting instruction to be issued in response to pressing of the shutter button 61 needs to be issued at the first operation performed once in the image capturing illustrated in FIG. 4F1. FIG. 4F4 illustrates a case where sequential image capturing has ended when panning of the digital camera 100 has been performed and the width (number of pixels) of an image which is obtained by combining the acquired pieces of image data has reached the maximum (for example, 20,000 pixels). In other words, FIG. 4F4 illustrates a state in which sequential image capturing has ended when it is determined in step S314 that image data corresponding to the maximum angle of view calculated in step S303 has been acquired. In this way, image capturing is sequentially performed with the image capturing range gradually changed until the number of pixels of the maximum width of a recordable panoramic image is reached while the user is panning the digital camera 100. FIG. 4F5 illustrates a panoramic image finally obtained as a result of sequentially combining a plurality of captured images (still images). The number of pixels of the maximum width of a recordable panoramic image is determined by the type of a digital camera or by manual selection settings.

Furthermore, in step S310 described above, the system control unit 50 calculates the angle of view of a combined image obtained by sequentially combining captured images. A specific calculation method is described. The proportion of the angle of view of one captured image to the magnitude of the maximum angle of view recorded in the combined image data is equivalent to the proportion of the number of pixels of the width of one captured image to the number of pixels of the width of the combined image. Thus, the angle of view $C\theta$ (rad) indicating the magnitude of the angle of view recorded in the combined image data is calculated by the following formula (4) based on formula (3) when the number of pixels of the width of the combined image is denoted by Cw (pixels).

$$C\theta = 2 \times (Cw/Iw) \times \arctan((Sw/2)/r) \quad (4)$$

As with the numerical example described with regard to step S303, panoramic image capturing in the horizontal direction is described. Suppose that the maximum width of an image which is able to be recorded in panoramic image capturing for one image is 5,000 pixels, the imaging unit 22 is a CMOS sensor having an effective pixel portion with a horizontal width of 22.7 mm, and the focal length of the lens 103 is set to 18 mm. If the horizontal width of the combined image data obtained at a time is 2,000 pixels, the range of the field of view recorded in the combined image is obtained as an angle of view of about 52°. These calculation processing operations are performed by the system control unit 50 and the image processing unit 24, and pieces of fixed data, such as the one-captured image width and the image sensor width, which are previously recorded on the system memory 52 or the recording medium 200, are loaded by the memory control unit 15 and are processed by the image processing unit 24. With regard to data about the combined image width, the combined image data stored in the memory 32 in step S309 is loaded and acquired by the memory control unit 15 and is processed by the image processing unit 24. With regard to information about the focal length, the information recorded on the memory 32 is also loaded by the memory control unit 15 and is processed by the image processing unit 24. The calculated angle-of-view information about the combined image data is then recorded on the memory 32 via the memory control unit 15. Alternatively, the angle of view can be calculated by multiplying the angle of view calculated in step S303 by a value obtained by dividing the combined image width (number of pixels) by the maximum image width of an image able to be obtained by combining.

Figure 5C:
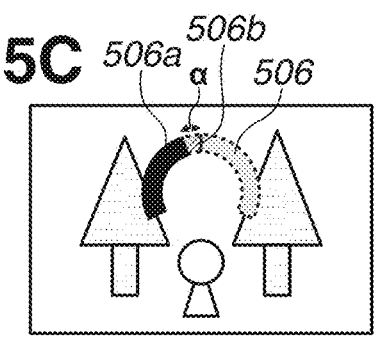
Figure 5D:
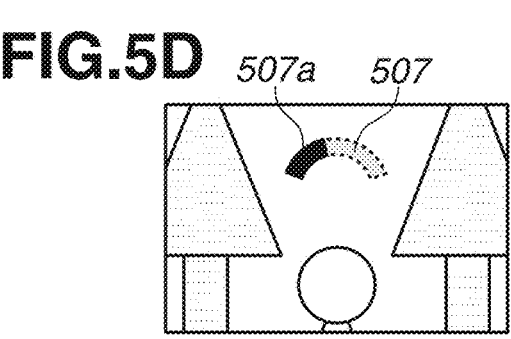

In step S311, the system control unit 50 updates a progress item displayed to indicate a degree of panoramic progress. The system control unit 50 updates the progress item based on the magnitude of the maximum angle of view recorded in the combined image data (image data obtained by combining captured images) calculated in step S310. The progress items 506 and 507 illustrated in FIGS. 5C and 5D respectively correspond to the items 503 and 504 illustrated in FIGS. 5A and 5B, and the entire width of each of the items 503 and 504 indicates the magnitude of the angle of view (range of the field of view) available for recording as one panoramic image. Each of an area 506a of the progress item 506 and an area 507a of the progress item 507 indicates the magnitude of the angle of view obtained by combining. Each of the areas 506a and 507a is an arc generated as image data to indicate the angle corresponding to the angle of view acquired in step S310. Thus, as combining of images progresses, the displaying manner of the progress item is changing as much as the angle of an arc corresponding to an angle of view newly added by combining. In the examples illustrated in FIGS. 5C and 5D, each of which indicates a case where panning is performed to the right, in order from the left end toward the right end, the displaying manner of the progress item is changing from gray to black as much as the angle of an arc corresponding to an angle of view newly added by combining. In other words, the displaying manner of the progress item is gradually changing in order from one end toward the panning direction of the camera (the other end). A hatched-line portion 506b illustrated in FIG. 5C is not actually displayed but is illustrated for purposes of explanation, and, when a new captured image is added for combining in the combining processing performed next in step S309, the displaying manner of an area defined by the angle α of an arc corresponding to the associated angle of view changes from gray to black. Thus, as the number of captured images increases and the angle of view obtained by combining increases accordingly, the portion the displaying manner of which is changing becomes larger. Furthermore, in a case where panning is performed to the left, the displaying manner of the progress item is gradually changing in order from the right end toward the left end. Furthermore, in step S310, instead of calculating the angle of view, the proportion of the image width (number of pixels) of the current combined image to the maximum image width of a combined image able to be obtained by combining can be obtained and the displaying manner of the progress item can be changed according to the obtained proportion.

In step S312, the system control unit 50 determines whether image capturing has ended. Panoramic image capturing ends when the combined image has reached the number of pixels available for recording as one panoramic image and in response to an image capturing ending instruction being issued by the user. The combined image data recorded on the memory 32 is acquired via the memory control unit 15 and is then compared with the previously-determined maximum size of a recordable panoramic image by the image processing unit 24, and, when the combined image data reaches the maximum size, image capturing ends. If it is determined that image capturing has ended (YES in step S312), the processing proceeds to step S313, and, if not (NO in step S312), the processing returns to step S308. If, in step S312, it is not determined that image capturing has ended, processing in step S308 to step S311, i.e., a series of processing operations of performing image capturing and displaying the degree of progress, is repeated.

In step S313, the system control unit 50 performs recording processing. More specifically, the system control unit 50 performs processing for recording the image obtained by combining in step S309 on the recording medium 200.

According to the above-described exemplary embodiment, the user is enabled to understand, before panoramic image capturing, the magnitude of the angle of view available for recording as one panoramic image and the degree of progress of panoramic image combining. With this, the user is enabled to adjust the starting position of panoramic image capturing or the appropriate focal length prior to image capturing, thus easily performing image capturing within an intended range and saving the trouble of performing unwanted preliminary image capturing.

[Displaying of Panning Speed]

Moreover, the speed during panning to change the direction of the imaging apparatus can be configured to be displayed. When, as in panoramic image capturing, the user performs panning while holding the digital camera 100 by hand, even if the width of swinging is the same, as the focal length becomes longer and the angle of view become larger according to, for example, an increase of the zoom magnification, the amount of movement of the field of view formed on the image sensor becomes larger. In other words, since, during image combining, an area of overlapping with a preceding captured image is used as an overlap width, it is to perform subsequent image capturing in such a way as to leave the area of overlapping, so that, as the focal length becomes longer, the speed of panning is to be decreased. However, it is difficult for the user to understand what speed is appropriate to performing panning. Therefore, performing panning at too high speed may cause a failure in panoramic image capturing, and performing panning at too low speed may cause an excessive performance of image capturing.

Therefore, an item used to expressly indicate an appropriate panning speed to the user can be displayed together with the range of the angle of view available for recording as one panoramic image. The appropriate panning speed is obtained based on the angle-of-view information calculated in step S303, the maximum size of a panoramic image, the size of an image able to be captured by image capturing performed once, and pixel size information about an overlap width for combining. How many images are to be captured to generate one panoramic image is calculated based on the above-mentioned pieces of information, and an angle at which to perform panning for every image capturing is calculated based on the maximum width of a panoramic combined image. Then, an image capturing interval in panoramic image capturing previously defined in the digital camera 100 is calculated based on the image capturing speed and the combining processing speed. Finally, the panning speed is calculated based on the image capturing interval and an angle at which to perform panning between image capturing and image capturing. Then, a speed guide such as that illustrated in FIG. 5E or 5F is displayed based on the calculated panning speed.

Figure 5E:
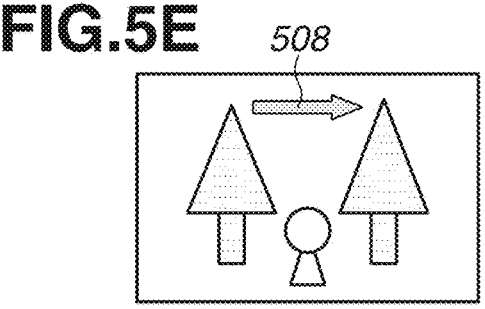
Figure 5F:
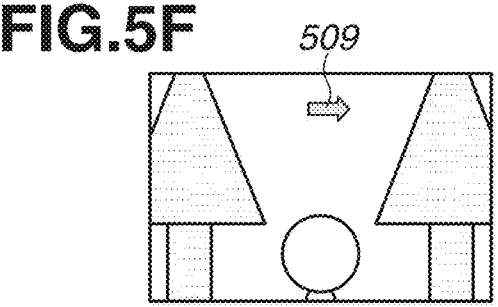

FIG. 5E, which corresponds to FIG. 5A, illustrates displaying of a speed guide 508, and FIG. 5F, which corresponds to FIG. 5B, illustrates displaying of a speed guide 509. For example, when the focal length in the case of FIG. 5E is assumed to be 18 mm and the focal length in the case of FIG. 5F is assumed to be 36 mm, since faster panning is allowed to be performed in the case of the shorter focal length, the arrow of the speed guide 508 is longer than that of the speed guide 509, so that the speed guide 508 indicates that faster panning is allowed to be performed. On the other hand, in a case where the speed guide 509 is displayed, the user can understand that panning should be performed slowly. Then, such guides are not limited to an arrow-like object illustrated by an example, but can be an icon which performs an animation motion at the calculated speed and can be have any form as long as the calculated appropriate speed can be indicated. For example, the speed can be expressed by a number. Moreover, an indication indicating the panning speed can be displayed together with an item indicating the magnitude of the angle of view available for recording as one panoramic image, such as that illustrated in one of FIGS. 5A to 5D. Moreover, the indication indicating the appropriate panning speed can be displayed together with an item indicating the current panning speed, thus enabling understanding whether the current panning speed is higher or lower than the appropriate panning speed.

According to the above-described example, the user is enabled to understand in advance at what panning speed the user should perform panoramic image capturing. This makes it easier for the user to implement panning at an appropriate speed, so that the failure of panoramic image capturing or the excessive image capturing can be prevented or reduced.

Furthermore, while, in the description of the above-described exemplary embodiment, indicating the magnitude of the angle of view available for recording as one panoramic image has been described with use of FIGS. 5A to 5F, the displaying manner of an item is not limited to the above-described ones.

Figure 5G:
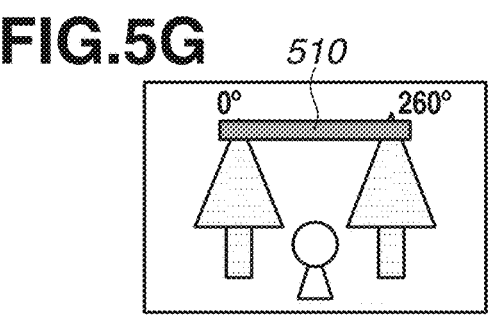
Figure 5H:
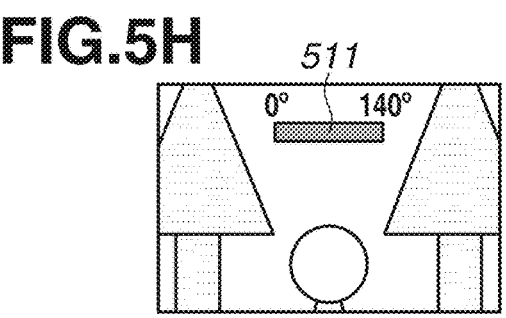

FIGS. 5G and 5H illustrate examples of displaying of rectangular bars. An item 510 illustrated in FIG. 5G corresponds to the item 503, and an item 511 illustrated in FIG. 5H corresponds to the item 504. These items are generated as rectangular image data with a length proportional to the magnitude of the angle of view calculated in step S303, based on template image data about rectangular bars.

Figure 5I:
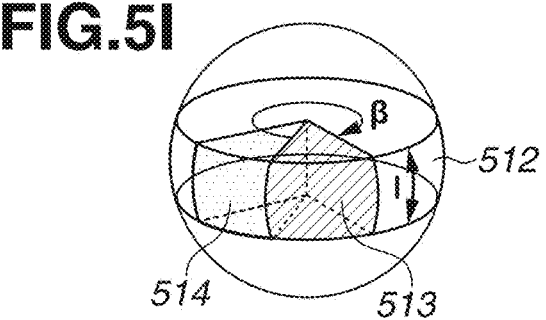

FIG. 5I illustrates an example of displaying of a circular three-dimensional item. A portion corresponding to an angle obtained by subtracting a fan-like diagonal-hatched portion 513 from an area 512 compassing a circle with a width 1, in other words, a portion corresponding to the angle β, indicates the magnitude of the angle of view available for recording as one panoramic image. After panoramic image capturing is started, the displaying manner is changing from the original displaying manner as in a dot-hatched portion 514, thus indicating the degree of progress of combining.

Figure 5J:
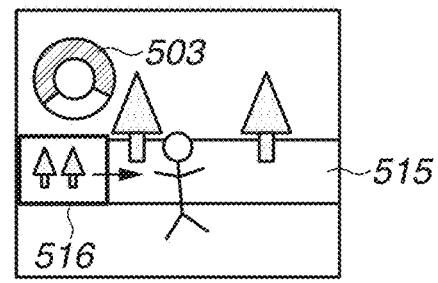

FIG. 5J illustrates an example of displaying in which not only the magnitude of the angle of view available for recording as one panoramic image is indicated but also the degree of progress of combining is indicated by gradually displaying a combined image in a band-like manner. In FIG. 5J, the magnitude of the angle of view available for recording as one panoramic image is indicated by an item 503 and the combined image is displayed in an area 515. During panoramic image capturing, the user pans the digital camera 100 in such a way as to move a frame 516 to the right in the area 515. The user is enabled to perform panning while confirming that images are being combined in the area 515.

These icons for guiding are not limited to the arc-like bars or rectangular bars illustrated as examples, but have any form as long as the calculated angle of view is able to be indicated. Moreover, these guides only need to be guides able to display the angle of view and, therefore, do not need to be icons such as those described above but can be items which directly indicate, for example, a numerical value equivalent to the calculated angle of view.

Furthermore, while, in the above description, an example in which focal length information about the lens is acquired as zoom magnification information has been described, the present disclosure is not limited to this, but can be applied to the following case. Specifically, for example, zoom magnification information about electronic zoom can be acquired, and, for example, the panoramic image capturing angle or panning speed indication to be displayed in a screen can be naturally changed according to the acquired zoom magnification information.

A variety of control operations performed by the system control unit 50 in the above-described exemplary embodiment can be performed by one piece of hardware. Alternatively, a plurality of pieces of hardware can share the processing to control the entire apparatus.

While the exemplary embodiments of the present disclosure have been described with use of specific examples, the present disclosure is not limited to the specific exemplary embodiments and examples, and it is to be understood that changes and variations can be made without departing from the spirit or scope of the present disclosure. The exemplary embodiments described above are merely examples and can be appropriately combined.

Although the case is exemplified in the above embodiments in which the present disclosure is applied to the digital camera 100, the present disclosure is not limited to this and is applicable to a recording control apparatus capable of recording the recording data before the recording instruction is issued. Specifically, the present disclosure is applicable to, for example, a mobile phone terminal, a mobile image viewer, a printer apparatus provided with a viewfinder, a digital photo frame, a music player, a game machine, or an electronic book reader.

Other Embodiments

Some exemplary embodiments of the present disclosure are implemented by performing the foregoing processes. Specifically, software implementing the functions of the above exemplary embodiments can be supplied to a system or an apparatus via a network or various recording media, and one or more computers (or a central processing unit (CPU) or a micro processing unit (MPU)) in the system or the apparatus can read out program codes for execution. In this case, the programs and a non-volatile recording medium having the programs stored thereon constitute some exemplary embodiments.

Some exemplary embodiments can also be implemented by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-221289 filed Nov. 16, 2017, which is hereby incorporated by reference herein in its entirety.

What is claimed is:

1. An image capturing control apparatus comprising:
a processor;
a memory storing a program which, when executed by the processor, causes the image capturing control apparatus to:
perform control to combine a plurality of images acquired by a series of image capturing operations to generate a combined image wider in angle of view than each of the acquired plurality of images;
receive focal length information to be used in the series of image capturing operations, wherein the focal length information is changeable before starting the series of image capturing operations; and
control a display unit in accordance with the received focal length information to display, while displaying a live view image acquired by an image capturing operation using a focal length based on the received focal length information before the series of image capturing operations for acquiring the plurality of images as elements of the combined image is performed,
wherein the focal length information is a first length, a rectangular item is displayed in a first shape over a first live view image acquired by an image capturing operation using the first length, wherein the rectangular item displayed in the first shape indicates an angle of view of a first combined image generated using images acquired by the series of image capturing operations using the first length, wherein the focal length information is changed from the first length to a second length different from the first length while the rectangular item is displayed in the first shape over the first live view image acquired by the image capturing operation using the first length,
wherein the focal length information is changed prior to completion of the acquisition of the plurality of images, the rectangular item is displayed in a second shape over a second live view image acquired by an image capturing operation using the second length,
wherein the second shape is different from the first shape, and
wherein the rectangular item displayed in the second shape indicates an angle of view of a second combined image generated using images acquired by the series of image capturing operations using the second length.

2. The image capturing control apparatus according to claim 1,
wherein the program when executed by the processor further causes the image capturing control apparatus to start the series of image capturing operations, in response to an instruction that a shutter button activation is detected.

3. The image capturing control apparatus according to claim 2, wherein the combined image is generated sequentially from a plurality of images acquired by starting the series of image capturing operations after the instruction.

4. The image capturing control apparatus according to claim 1, wherein the combined image is displayed together with the rectangular item after starting the series of image capturing operations.

5. The image capturing control apparatus according to claim 1, wherein, in the series of image capturing operations, image capturing is performed while a direction of an imaging unit is being changed.

6. The image capturing control apparatus according to claim 1, wherein the focal length information depends on a zoom magnification.

7. The image capturing control apparatus according to claim 6, wherein the zoom magnification is about optical zoom or electronic zoom.

8. A non-transitory computer-readable recording medium having stored thereon a program that causes a computer to function as each unit of the image capturing control apparatus according to claim 1.

9. The image capturing control apparatus according to claim 1, wherein the focal length information is related to a focal length of an optical system used for the image capturing operation.

10. The image capturing control apparatus according to claim 1, wherein the focal length information changes in accordance with the received focal length information from a zoom operation performed by a user.

11. The image capturing control apparatus according to claim 1, further comprising: a first lens unit and a second lens unit which is different from the first lens unit,
wherein the focal length information is the first length in a case where the first lens unit is used for the image capturing operation, and the focal length information is the second length in a case where the second lens unit different from the first lens unit is used for the image capturing operation.

12. The image capturing control apparatus according to claim 1, wherein the changing of the focal length information is not performed during the series of image capturing operations.

13. The image capturing control apparatus according to claim 1, wherein the rectangular item displayed in the first shape is different in size from the rectangular item displayed in the second shape.

14. The image capturing control apparatus according to claim 13,
wherein the rectangular item displayed in the first shape is larger than the rectangular item displayed in the second shape, and
wherein the first length is shorter than the second length.

15. The image capturing control apparatus according to claim 1, further comprising:
a plurality of lens units different from one another in focal length,
wherein the program when executed by the processor further causes the image capturing control apparatus to receive the focal length information from the plurality of lens units, and
receive the focal length information from the plurality of lens units,
wherein the plurality of lens units is used while displaying a live view image acquired by an image capturing operation before the series of image capturing operations, and the plurality of images is acquired by performing the series of image capturing operations to generate the combined image by using at least one lens unit among the plurality of lens units during the series of image capturing operations.

16. The image capturing control apparatus according to claim 1, wherein the image capturing control apparatus is at least one of a digital camera and a mobile phone.

17. A method performed by one or more processes executing on a system control unit comprising:
performing control to combine a plurality of images acquired by a series of image capturing operations to generate a combined image wider in angle of view than each acquired plurality of images;
receiving focal length information to be used in the series of image capturing operations, wherein the focal length information is changeable before starting the series of image capturing operations; and
performing control in accordance with the received focal length information to display, while displaying a live view image acquired by an image capturing operation using a focal length based on the received focal length information before the series of image capturing operations for acquiring the plurality of images as elements of the combined image is performed,
wherein the focal length is a first length, a rectangular item is displayed in a first shape over a first live view image acquired by an image capturing operation using the first length, wherein the rectangular item displayed in the first shape indicates an angle of view of a first combined image generated using images acquired by the series of image capturing operations using the first length
wherein the focal length information is changed from the first length to a second length different from the first length while the rectangular item is displayed in the first shape over the first live view image acquired by the image capturing operation using the first length,
wherein the focal length information is changed prior to completion of the acquisition of the plurality of images, the rectangular item is displayed in a second shape over a second live view image acquired by an image capturing operation using the second length,
wherein the second shape is different from the first shape, and
wherein the rectangular item displayed in the second shape indicates an angle of view of a second combined image generated using images acquired by the series of image capturing operations using the second length.

* * * * *